(12) United States Patent
Monkowski (10) Patent No.: US 8,122,407 B2
(45) Date of Patent: Feb. 21, 2012

(54) METHOD AND SYSTEM FOR IMPLEMENTING PATTERN MATCHING OF INTEGRATED CIRCUIT FEATURES USING VORONOI DIAGRAMS

(75) Inventor: Michael D. Monkowski, New Windsor, NY (US)

(73) Assignee: International Business Machines Corporation, Armonk, NY (US)

( * ) Notice: Subject to any disclaimer, the term of this patent is extended or adjusted under 35 U.S.C. 154(b) by 795 days.

(21) Appl. No.: 12/137,616

(22) Filed: Jun. 12, 2008

(65) Prior Publication Data

US 2009/0310870 A1 Dec. 17, 2009

(51) Int. Cl.
*G06F 17/50* (2006.01)

(52) U.S. Cl. .................................... 716/111; 716/136

(58) Field of Classification Search .................. 716/111, 716/136
See application file for complete search history.

(56) References Cited

U.S. PATENT DOCUMENTS

| | | | |
|---|---|---|---|
| 6,178,539 B1 | 1/2001 | Papadopoulou et al. | |
| 6,317,859 B1 | 11/2001 | Papadopoulou | |
| 6,810,510 B2 | 10/2004 | Bakarian et al. | |
| 6,817,003 B2 | 11/2004 | Lippincott et al. | |
| 7,143,371 B2 | 11/2006 | Allen et al. | |
| 7,155,698 B1 | 12/2006 | Gennari | |
| 7,240,305 B2 | 7/2007 | Lippincott | |
| 7,240,306 B2 | 7/2007 | Allen et al. | |
| 7,797,652 B2 * | 9/2010 | Monkowski et al. | 716/136 |
| 2004/0096092 A1 * | 5/2004 | Ikeda | 382/141 |
| 2005/0172247 A1 | 8/2005 | Papadopoulou et al. | |
| 2005/0202326 A1 * | 9/2005 | Gordon et al. | 430/30 |
| 2006/0150130 A1 | 7/2006 | Allen et al. | |

OTHER PUBLICATIONS

F. Dehne et al.; "The Big Sweep": On the Power of the Wavefront Approach to Voronoi Diagrams; Algorithmica 17; 1997; pp. 19-32.
D. Maynard et al.; Swampfinder; IEEE/SEMI Advanced Semiconductor Manufacturing Conference; 2001; pp. 151-155.
F.E. Gennari et al; A Pattern Matching System for Linking TCAD and EDA; IEEE Computer Society; 2004.
D.L. DeMaris et al.; An Information Retrieval System for the Analysis of Systematic Defects in VLSI; IEEE Computer Society; 2004.
V. Dai et al; DRC Plus: Augmenting Standard DRC With Pattern Matching on 2D Geometries; SPIE Vo. 6521; 2007.
M.Y. Tan; A Survey of Distance Metrics Approximating L2 in the Construction of Voronoi Diagrams for VLSI Applications; 20th Computer Science Seminar.
E. Papadopoulou et al.; Critical Area Computation—A New Approach; ISPD 98; Apr. 6-8, 1998; pp. 89-94.

(Continued)

*Primary Examiner* — Vuthe Siek
(74) *Attorney, Agent, or Firm* — Cantor Colburn LLP; Dan Schnurmann (57) ABSTRACT

A method for implementing pattern matching of integrated circuit features includes computing Voronoi edge regions for both a reference configuration and a search space of an integrated circuit design to be searched and presenting the computed Voronoi edge regions of the reference configuration to a user; receiving one or more selected bisectors of the Voronoi computed reference configuration from the user, indicative of user identified salient regions of design shapes and/or corners to be searched, so as to define one or more search elements, wherein a search element comprises a given bisector and a pair of Voronoi edge regions bounded thereby; constructing a search pattern from the one or more search elements defined from the reference configuration; examining the search space for matching sequences with respect to the search pattern; and highlighting resulting matching patterns in the search space for the user.

24 Claims, 5 Drawing Sheets

OTHER PUBLICATIONS

E. Bengoetxea, Ph.D.; "Chapter 2: The graph matching problem;" Inexact Graph Matching Using Estimation of Distribution Algorithms; Ecok Nationale Superieux des Telecommunications (Paris); 2002; pp. 3-18.

F. Dorn et al.; Efficient Exact Algorithms on Planar Graphs: Exploiting Sphere cut Decompositons; Department of Information and Computing Sciences, Utrecht University; Technical Report UU-CS-2006-006.

D. Eppstein; Subgraph Isomorphism in Planar Graphs and Related Problems; Journal of Graph Algorithms and Applications vol. 3, No. 3, 1999, pp. 1-27.

* cited by examiner

METHOD AND SYSTEM FOR IMPLEMENTING PATTERN MATCHING OF INTEGRATED CIRCUIT FEATURES USING VORONOI DIAGRAMS

BACKGROUND

The present invention relates generally to integrated circuit device design techniques and, more particularly, to a method and system for implementing pattern matching of integrated circuit features using Voronoi diagrams.

In designing an integrated circuit (IC) device, engineers or designers typically rely on computer design tools to help create an IC schematic or design, which can include a multitude of individual devices, such as transistors, coupled together to perform a certain function. To actually fabricate the IC device in or on a semiconductor substrate, the IC device schematic must be translated into a physical representation or layout, which itself can then be transferred onto a semiconductor substrate. Computer aided design (CAD) tools can be used to assist layout designers with translating the discrete circuit elements into shapes, which will embody the devices themselves in the completed IC device. These shapes make up the individual components of the circuit, such as gate electrodes, diffusion regions, metal interconnects and the like.

The software programs employed by the CAD systems to produce layout representations are typically structured to function under a set of predetermined design rules in order to produce a functional circuit. Often, the design rules are determined by certain processing and design limitations based roughly on the patternability of layout designs. For example, design rules may define the space tolerance between devices or interconnect lines. Once the layout of the circuit has been created, the next step in manufacturing the IC device is to transfer the layout onto a semiconductor substrate. Optical lithography or photolithography is a well-known process for transferring geometric shapes onto the surface on a semiconductor wafer. The photolithography process generally begins with the formation of a photoresist layer on the top surface of a semiconductor substrate or wafer. A reticle or mask having fully light non-transmissive opaque regions (which are often formed of chrome) and fully light transmissive clear regions (which are often formed of quartz) is then positioned over the photoresist coated wafer.

The mask is placed between a radiation or light source, which can produce light of a pre-selected wavelength (e.g., ultraviolet light) and geometry, and an optical lens system, which may form part of a stepper apparatus. When the light from the light source is directed onto the mask, the light is focused to generate a reduced mask image on the wafer, typically using the optical lens system, which may contain one or several lenses, filters, and/or mirrors. This light passes through the clear regions of the mask to expose the underlying photoresist layer, and is blocked by the opaque regions of the mask, leaving that underlying portion of the photoresist layer unexposed. The exposed photoresist layer is then developed, typically through chemical removal of the exposed or unexposed regions of the photoresist layer. The end result is a semiconductor wafer coated with a photoresist layer exhibiting a desired pattern, which defines the geometries, features, lines and shapes of that layer. This pattern can then be used for etching underlying regions of the wafer.

It is frequently necessary during the design, development, and failure analysis of IC devices to find particular configurations of design shapes in the physical layout of the mask layers used to manufacture ICs. This task is currently accomplished by using Design Rule Checking (DRC) tools such as, for example, "SwampFinder" developed by Daniel N. Maynard, et al. (IBM Microelectronics Division) or through image processing software techniques based on shape primitives such as discussed in "A Pattern Matching System for Linking TCAD and EDA," Frank E. Gennari, et al., Proc. ISQED 2004 (IEEE), and in "An Information Retrieval System for the Analysis of Systematic Defects in VLSI," David L. DeMaris, et al., Proc. ICTAI 2004 (IEEE).

In the former approach, DRC tools allow for a low percentage of both false positives and false negatives with respect to a searched reference pattern because the tool can be used to define the salient features of the pattern (i.e., whatever is considered to be "important" features by the designer). However, such tools also require specialized programming skills in order to encode the reference pattern. On the other hand, the image processing tools provide a simpler user interface, but suffer from a high percentage of false positives and false negatives because they do not provide for saliency.

Accordingly, it would be desirable to be able to identify particular design patterns deemed salient to a designer, but in a manner that does not require learning or specialized knowledge of DRC software programs.

SUMMARY

The foregoing discussed drawbacks and deficiencies of the prior art are overcome or alleviated, in an exemplary embodiment, by a method for implementing pattern matching of integrated circuit features, including computing Voronoi edge regions for both a reference configuration and a search space of an integrated circuit design to be searched and presenting the computed Voronoi edge regions of the reference configuration to a user; receiving one or more selected bisectors of the Voronoi computed reference configuration from the user, indicative of user identified salient regions of design shapes and/or corners to be searched, so as to define one or more search elements, wherein a search element comprises a given bisector and a pair of Voronoi edge regions bounded thereby; constructing a search pattern from the one or more search elements defined from the reference configuration; examining the search space for matching sequences with respect to the search pattern; and highlighting resulting matching patterns in the search space for the user.

In another embodiment, a computer program product includes a computer readable computer program code for implementing pattern matching of integrated circuit features; and instructions for causing a computer to implement a method, the method further including computing Voronoi edge regions for both a reference configuration and a search space of an integrated circuit design to be searched and presenting the computed Voronoi edge regions of the reference configuration to a user; receiving one or more selected bisectors of the Voronoi computed reference configuration from the user, indicative of user identified salient regions of design shapes and/or corners to be searched, so as to define one or more search elements, wherein a search element comprises a given bisector and a pair of Voronoi edge regions bounded thereby; constructing a search pattern from the one or more search elements defined from the reference configuration; examining the search space for matching sequences with respect to the search pattern; and highlighting resulting matching patterns in the search space for the user.

A system for implementing pattern matching of integrated circuit features includes a computing network including a processing device in communication with one or more computer memory storage devices; and the computing network further configured to implement a method, the method including computing Voronoi edge regions for both a reference configuration and a search space of an integrated circuit design to be searched and presenting the computed Voronoi edge regions of the reference configuration to a user; receiving one or more selected bisectors of the Voronoi computed reference configuration from the user, indicative of user identified salient regions of design shapes and/or corners to be searched, so as to define one or more search elements, wherein a search element comprises a given bisector and a pair of Voronoi edge regions bounded thereby; constructing a search pattern from the one or more search elements defined from the reference configuration; examining the search space for matching sequences with respect to the search pattern; and highlighting resulting matching patterns in the search space for the user.

BRIEF DESCRIPTION OF THE DRAWINGS

Referring to the exemplary drawings wherein like elements are numbered alike in the several Figures.

DETAILED DESCRIPTION

Disclosed herein is a method and system for implementing pattern matching of integrated circuit features using Voronoi diagrams. Briefly stated, the space between nearest neighbor edges of an integrated circuit design is partitioned into Voronoi regions associated with pairs of interacting edges or corners. The user can either create a new layout design that represents the target pattern of interest or locate one such exemplar in the original design itself to be searched. The user then selects those Voronoi regions that define the salient interactions, optionally selects parametric constraints for the regions, and then the system locates similar patterns elsewhere in the design. If the returned similar patterns turn out not to correspond to the exact set the user intended, the user can subsequently modify the selections, constraints or properties based on a comparison between the target pattern and the unwanted similar pattern. Moreover, the system may also be used in combination with existing DRC tools.

As indicated above, an IC physical design includes several layers of design shapes representing features to be manufactured on a semiconductor chip. Sometimes, the interaction of shapes on a single design layer is of interest; other times, interactions of shapes across two or more layers are of interest. Queries across more than one layer can be accommodated by either a Boolean combination of results or by using a derived design layer constructed from Boolean combinations of the original layers. For purposes of illustration, the case of a pattern on a single design layer is discussed herein, however it will be appreciated that the present embodiments also apply to Boolean combinations of results and/or layers.

The configuration sought (also referred to herein as the reference configuration) may exist in the same design as is being searched or, alternatively, may exist in a separate design. If the reference configuration exists in a separate design, then Voronoi computations are done for both the separate design and the searched design. However, for ease of description, the reference configuration and the search space are referred to herein without regard to whether they exist in the same or different designs.

In addition, the abstract concept of desired interacting shapes is referred to herein as the reference pattern. The user's goal is to define the reference configuration by using a reference pattern, and then searching the design to identify similar configurations that match the reference pattern.

With respect to the Voronoi computations, the Voronoi regions associated with pairs of edges may be computed inside closed shapes (interior Voronoi regions) and between shapes (exterior Voronoi regions). The boundaries between the regions are called bisectors, which represent the locus of points equidistant from the two relevant edges. It should be understood that the metric used to measure this distance need not be the familiar Euclidian distance; rather, for efficiency of computation and pattern representation, other distance metrics are preferred. For example, distance metrics discussed by Mervyn Tan in "A Survey of Distance Metrics Approximating L2 in the Construction of Voronoi Diagrams for VLSI Applications" ($20^{th}$ Computer Science Seminar, Apr. 24, 2004) include unit shapes represented as octagons with edges that lie on orthogonal and directions 45 degrees to orthogonal (e.g., metrics "M3", "M4" and "M5" as termed by Tan).

Such octal metrics are particularly useful for analyzing IC layouts, as IC designs are primarily restricted to shapes with orthogonal edges along the two dimensional (2D) axes of the design. The octal metrics measure distances between these edges exactly and also generate Voronoi regions for interacting corners of the design shapes. In addition, when IC designs use edges other than orthogonal, they are usually 45 degrees with respect to orthogonal and can be accommodated well by the octal metrics. Thus although the embodiments described herein may use other distance metrics besides octal, an octal metric is used for purposes of illustration.

Voronoi edge regions are bounded by a single edge of a design shape and by two or more bisectors. A point where two or more bisectors intersect is called a vertex. If a Voronoi region contains vertices not connected by a bisector to the design shape, a bisector may optionally be added from that vertex to the design edge, wherein the bisector is normal to the design edge. This results in simplifying the Voronoi regions to having only three or four sides, which in turn simplifies the collection of different pattern elements. Thus, although this simplification technique of Voronoi regions need not be utilized in order to implement the present invention embodiments, it is described herein for purposes of illustration.

Figure 1:
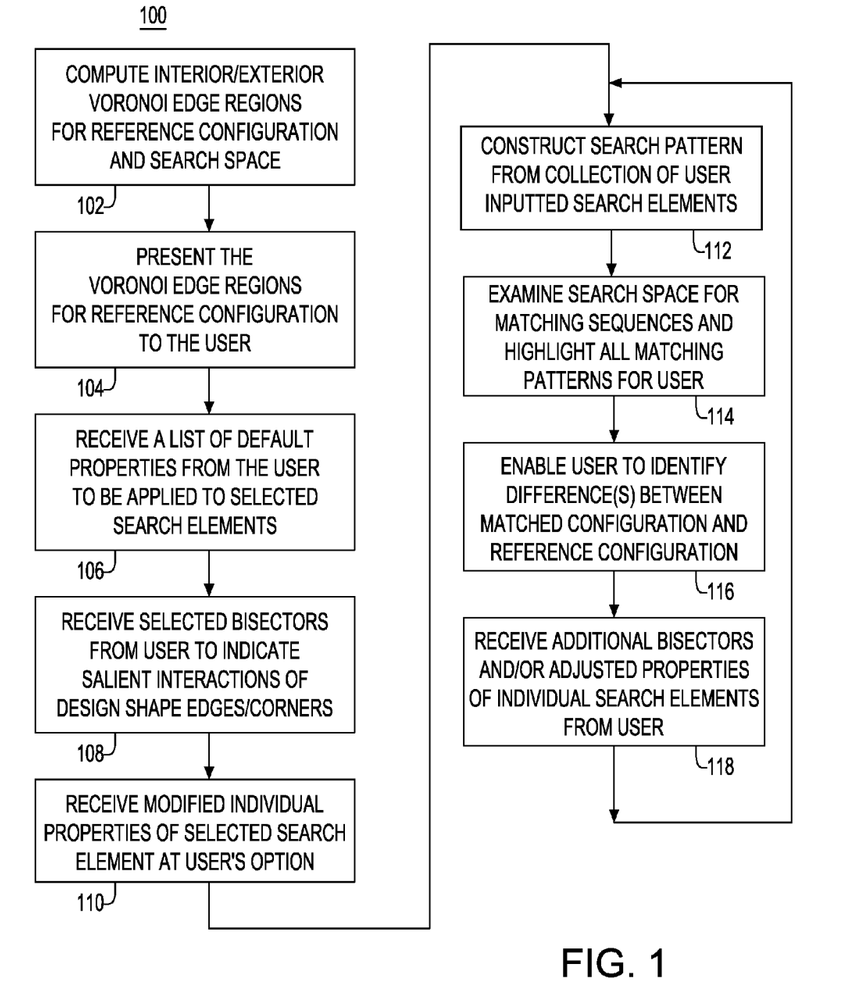
FIG. 1 is a process flow diagram illustrating a method for implementing pattern matching of integrated circuit features using Voronoi diagrams, in accordance with an embodiment of the invention.

Referring now to FIG. 1, there is shown a process flow diagram illustrating a method 100 for implementing pattern matching of integrated circuit features using Voronoi diagrams, in accordance with an embodiment of the invention. As shown in block 102, the method 100 begins by computing interior and/or exterior Voronoi edge regions for both a reference configuration to be searched and the search space. Again, these Voronoi edge regions may, in an exemplary embodiment, be further simplified so as to break down more complex geometrical Voronoi regions into simpler three and four-sided shapes, as illustrated in further detail hereinafter. Then, as indicated in block 104, the Voronoi edge regions for the reference configuration are presented (e.g., graphically) to a user.

In block 106, the system implementing method 100 receives, by user input, a list of default properties to be applied to search elements that are selected. These default properties may include, but are not limited to, for example: the orientation of the bisector (which may be specified in terms of class criteria such as orthogonal vs. non-orthogonal, orthogonal and 45-degree to orthogonal vs. all others, horizontal vs. all others, etc.); the orientations of the pair of shape edges; length criteria for the selected bisectors; length criteria for the bounding bisectors of the regions other than the selected bisector; and the number of bisectors connected to specific vertices of the two Voronoi regions.

Proceeding to block 108, the system implementing method 100 receives, by user input, selected bisectors to indicate salient interactions of edges, wherein each bisector represents the two Voronoi regions bounded thereby. A selected bisector and the two Voronoi regions associated therewith are collectively referred to herein as a "search element." All of the search elements form a continuous set (i.e., they are physically connected). If only exterior Voronoi regions are used, then salient design shapes can be chosen to connect the Voronoi regions. Such chosen design shapes are considered as search elements with a single property that identifies them as design shapes. In this regard, complex design shapes may comprise search elements.

As then shown in block 110, the system allows the user to optionally modify, after a search element is selected, its individual properties in order to better represent the criteria for matching. Then, as shown in block 112, the method constructs a search pattern from the collection of user inputted search elements. The search pattern may be represented as strings of properties connected in sequence, as the bisectors are geometrically connected. Because the bisectors are connected in two dimensions, the strings may also branch. This branching is converted to a set of linear sequences with indicated branch points. Additional information regarding compilation of the search pattern is discussed below.

Once the search pattern is completed, the method 100 proceeds to block 114, where the search space is examined for matching sequence, wherein each identified matching pattern is highlighted for the user. Such highlighting may include enabling the user to iterate though the matching configurations. In block 116, the method 100 further enables the user to determine that a "matched" configuration actually differs from the reference configuration, and if so determined, indicates to the user those adjacent search elements that differ between the two. Finally, in block 118, the method 100 enables the user to select additional bisectors and/or adjust the properties of individual search elements and repeat the process back at block 112, thereby fine-tuning the pattern matching results to more closely approximate the user's intended search results. It will be appreciated that any summary information may be stored and saved, such as for example the search pattern and the locations of the matches.

With respect to compiling the search pattern in block 112 described above, this technique is also referred to as an attributed planar sub-graph isomorphism. A general form of graph matching, which involves a common generalization of graph problems, such as finding Hamiltonian paths, cliques, matchings, girth, and shortest paths is described by David Eppstein in "Subgraph Isomorphism in Planar Graphs and Related Problems," Journal of Graph Algorithms and Applications, vol. 3, no. 3, pp. 1-27 (1999), the contents of which are incorporated herein by reference in their entirety. Additional information concerning approaches to graph matching problems may be found in Frederick Dorn, et al., "Efficient Exact Algorithms on Planar Graphs: Exploring Sphere Cut Decompositions," Technical Report UU-CS-2006-006, Department of Information and Computing Sciences, Utrecht University (2006), and in "Inexact Graph Matching Using Estimation of distribution Algorithms," Chapter 2, Endika Bengoetxea, Ph. D. Thesis, Ecole Supérieure des Telecommunications (Paris) (2002), the contents of which are also incorporated herein by reference in their entirety.

Figure 2:
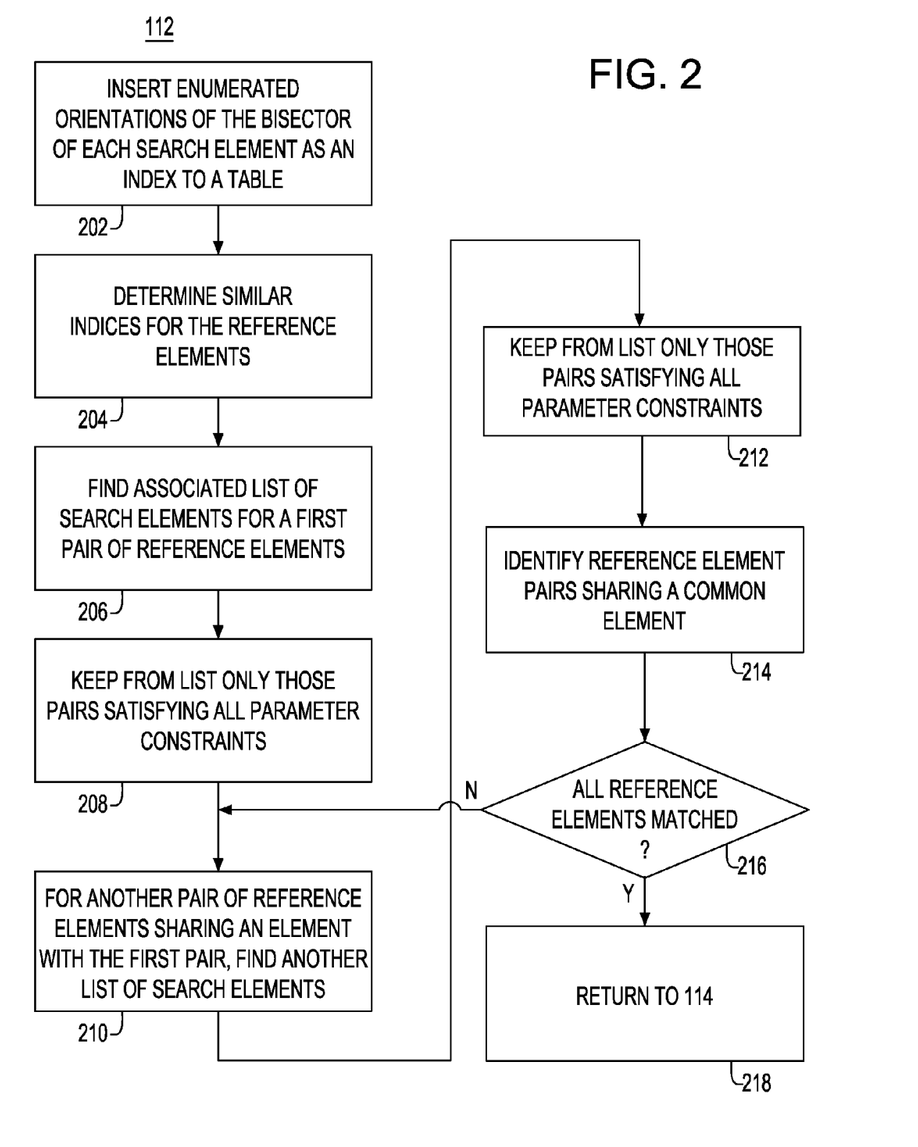
FIG. 2 is a process flow diagram illustrating one of the method operations of FIG. 1 in further detail.

Alternatively, a table lookup on pairs of connected search elements as an efficient heuristic graph-matching algorithm may also be used. In this regard, FIG. 2 is a process flow diagram illustrating one exemplary implementation of method operation 112 of FIG. 1 in further detail. As shown in block 202, enumerated orientations of the bisector of each search element are used as an index to a table. For every pair of connected elements in the search space, the orientations (and thereby the indices) are determined and inserted into a two dimensional table. Then, in block 204, similar indices are determined for the reference elements. Since reference elements may specify classes of orientations, there may be sets of indices for each element.

Beginning with a first of the pairs of reference elements, the process finds the associated list of search elements, as shown in block 206. If the search element specifies a class of orientations, then the lists for each legal combination of orientations are combined. From this list, only those pairs of elements satisfying all parameter constraints are kept, as indicated in block 208. Then, in block 210, for another pair of reference elements that shares an element with the first pair in block 206, another list of search elements is found, keeping again only those that satisfy all of the parameter constraints (block 212). Then, from the pairs in the resulting lists, those that share a common element are identified as reflected in block 214. This result provides the matches for the sequence of three search elements. Finally, blocks 210 through 214 are repeated, extending the reference string and the match sequences in a topographically consistent manner until all of the reference elements are matched. In FIG. 2, this is represented by decision block 216, which directs the process to loop back to block 210 in the event all of the reference elements are not matched, and exits back to block 114 of FIG. 1 once all of the reference elements are matched (block 218).

Figure 3A:
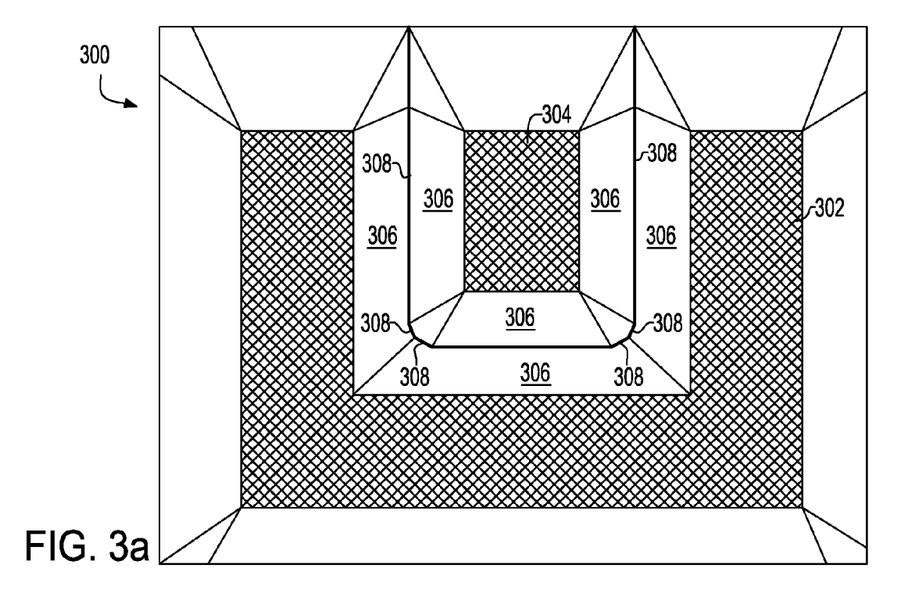
FIG. 3(a) is a schematic diagram of an exemplary integrated circuit feature partitioned into Voronoi regions for pattern matching in accordance with the exemplary process outlined in FIGS. 1 and 2.

FIG. 3(a) is a schematic diagram of an exemplary integrated circuit feature 300 partitioned into Voronoi regions for pattern matching in accordance with the exemplary process outlined in FIGS. 1 and 2. Feature 300 may represent, for example, a reference configuration such as a so-called "belt buckle" configuration, wherein a U-shaped feature 302 surrounds the end of a line feature 304. As further shown in FIG. 3(a), feature 300 is partitioned into exterior Voronoi regions, using an octal distance metric such as discussed above. Each Voronoi edge region 306 is bounded by a single edge of the design shape and two or more bisectors 308.

Figure 3B:
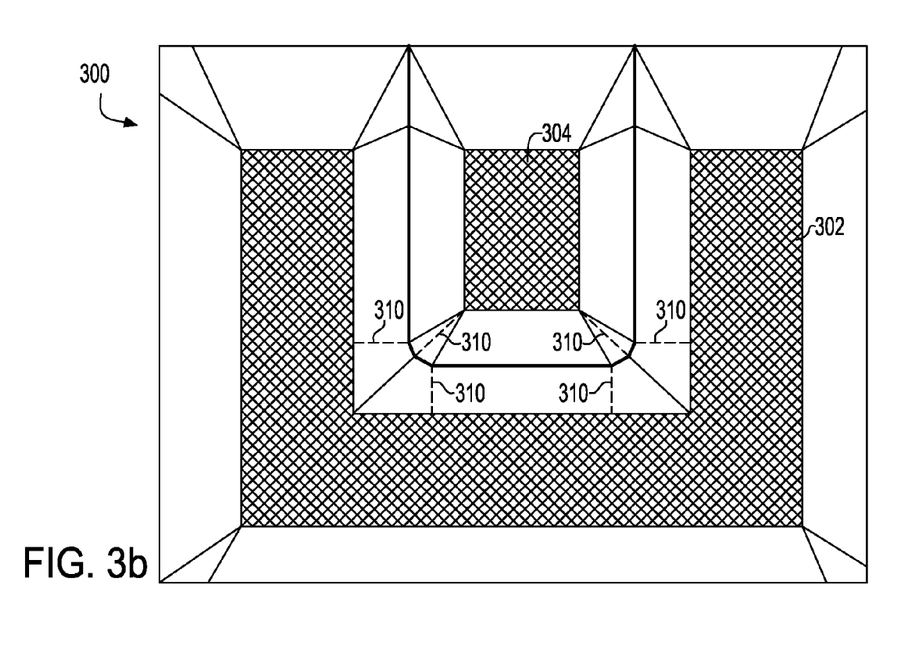
FIG. 3(b) illustrates the use of additional bisectors in the diagram of FIG. 3(a) in order to simplify Voronoi regions to three or four side, in accordance with a further embodiment of the invention.
Figure 3C:
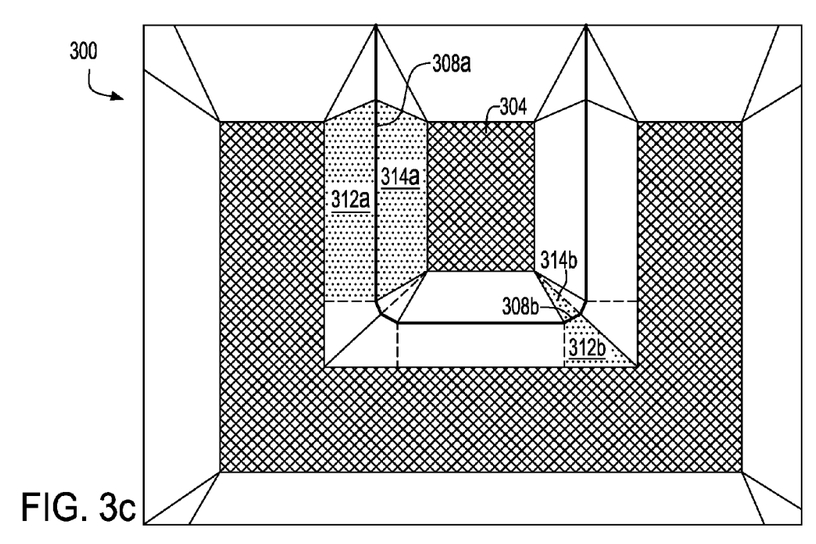
FIG. 3(c) illustrates the identification of exemplary search elements in FIG. 3(b) used in forming a search pattern.

As indicated above, additional bisectors or transition boundaries may be added for Voronoi regions containing vertices not connected by a bisector to the design shape to simplify the Voronoi regions to three or four sides. These additional bisectors 310 are indicated by the dashed lines shown in FIG. 3(b). In FIG. 3(c), two of the individual bisectors (specifically designated as 308a and 308b) are selected by a user, which indicates from the user's perspective salient interactions between design shape edges. Thus, one of the search elements, for example, comprises selected bisector 308a and the shaded pair of Voronoi regions 312a and 314a bounded by bisector 308a. Another search element comprises selected bisector 308b and the shaded pair of Voronoi regions 312a and 314a bounded by bisector 308b. The two search elements thus described are connected by design feature 304 in the center of the diagram.

Upon compilation of the identified search elements as described above, the resulting search pattern can be applied to the search space to identify matching sequences and highlight all matching patterns for examination by the user. As also indicated above, the user can then optionally select additional bisectors in the reference region and/or adjust the properties of individual search elements before running another search.

Figure 4:
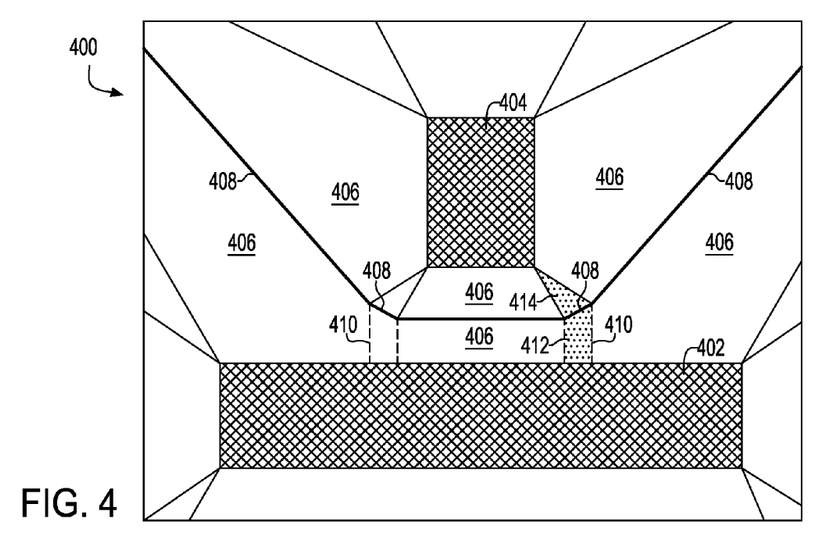
FIG. 4 is a schematic diagram of another exemplary integrated circuit feature partitioned into Voronoi regions for pattern matching in accordance with the process outlined in FIGS. 1 and 2.

FIG. 4 is a schematic diagram of another exemplary integrated circuit feature 400 partitioned into Voronoi regions for pattern matching in accordance with the process outlined in FIGS. 1 and 2. In contrast to feature 300, feature 400 presents less of a design concern as it represents the edge of a first shape 402 that is disposed orthogonal to a second shape 404. This reference feature is again partitioned into, for example, exterior Voronoi edge regions 406, each bounded by a single edge of the design shape and two or more bisectors 408. Additional bisectors or transition boundaries 410 are added for Voronoi regions containing vertices not connected by a bisector to the design shape to simplify the Voronoi regions to three or four sides. In this example, the identified salient regions may only be the single bisector 408 and the pair of shaded Voronoi regions 412 and 414 bounded by that bisector. With respect to FIG. 3(c), although the design in FIG. 4 depicts a similar "line end to line side" configuration, the search elements in FIG. 4 are not the same as those in FIG. 3, and thus the two patterns would not be considered matches.

Figure 5:
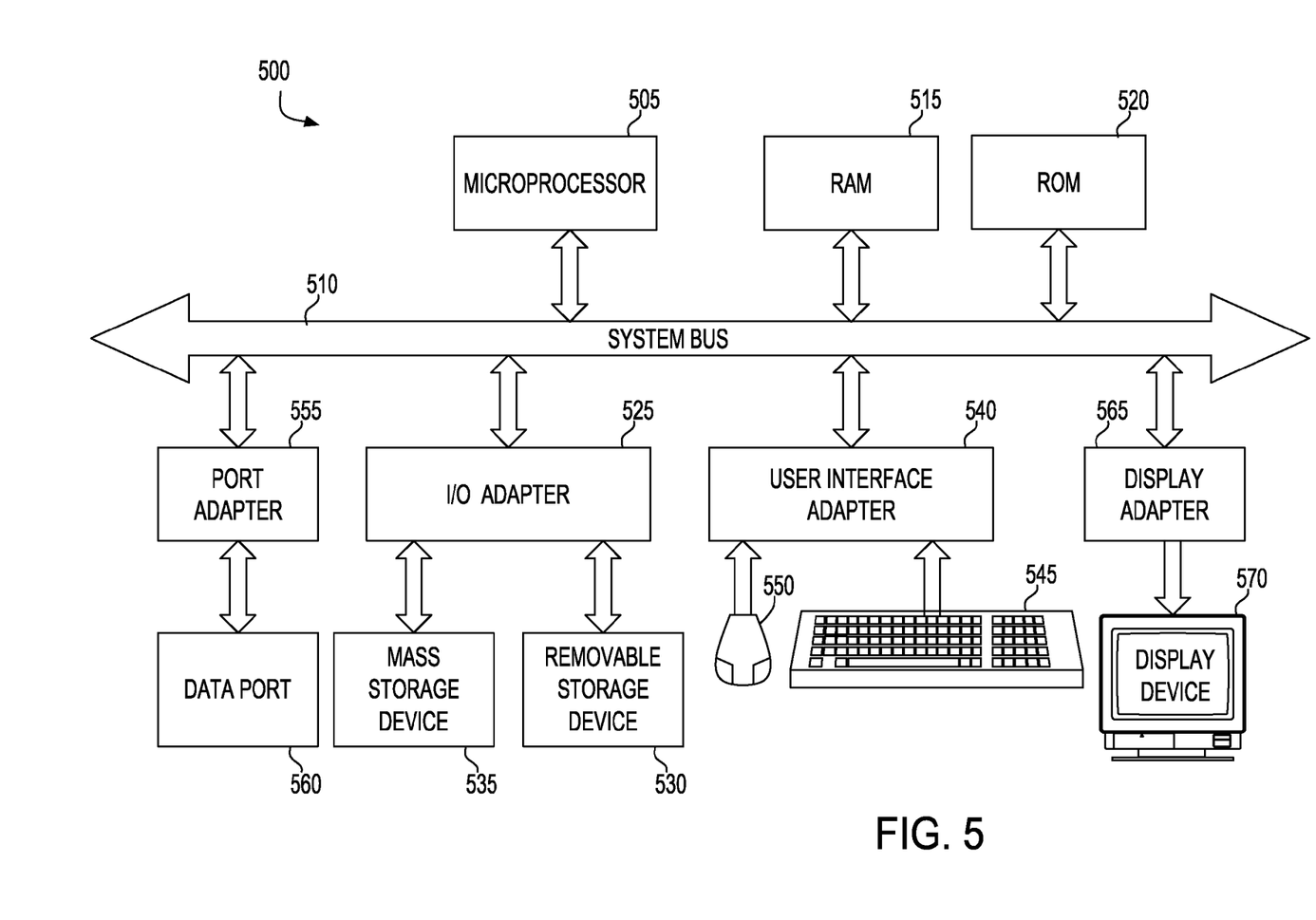
FIG. 5 is a schematic block diagram of a general-purpose computing system suitable for practicing embodiments of the present invention.

Generally, the method embodiments for implementing pattern matching of integrated circuit features using Voronoi diagrams may be practiced with a general-purpose computer and the method may be coded as a set of instructions on removable or hard media for use by the general-purpose computer. FIG. 5 is a schematic block diagram of a general-purpose computing system suitable for practicing embodiments of the present invention. In FIG. 5, computing system 500 has at least one microprocessor or central processing unit (CPU) 505. CPU 505 is interconnected via a system bus 510 to a random access memory (RAM) 515, a read-only memory (ROM) 520, an input/output (I/O) adapter 525 for a connecting a removable data and/or program storage device 530 and a mass data and/or program storage device 535, a user interface adapter 540 for connecting a keyboard 545 and a mouse 550, a port adapter 555 for connecting a data port 560 and a display adapter 565 for connecting a display device 570.

ROM 520 contains the basic operating system for computing system 500. The operating system may alternatively reside in RAM 515 or elsewhere as is known in the art. Examples of removable data and/or program storage device 530 include magnetic media such as floppy drives and tape drives and optical media such as CD ROM drives. Examples of mass data and/or program storage device 535 include hard disk drives and non-volatile memory such as flash memory. In addition to keyboard 545 and mouse 550, other user input devices such as trackballs, writing tablets, pressure pads, microphones, light pens and position-sensing screen displays may be connected to user interface 540. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 530, fed through data port 560 or typed in using keyboard 545.

In view of the above, the present method embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described above and illustrated in FIGS. 1 and 2.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for implementing pattern matching of integrated circuit features, the method comprising:

computing, using a processing device, Voronoi edge regions for both a reference configuration and a search space of an integrated circuit design to be searched and presenting the computed Voronoi edge regions of the reference configuration to a user;

receiving, by the processing device, one or more selected bisectors of the Voronoi computed reference configuration from the user, indicative of user identified salient regions of design shapes and/or corners to be searched, so as to define one or more search elements, wherein a search element comprises a given bisector and a pair of Voronoi edge regions bounded thereby;

constructing, using the processing device, a search pattern from the one or more search elements defined from the reference configuration;

examining, using the processing device, the search space for matching sequences with respect to the search pattern; and highlighting resulting matching patterns in the search space for the user.

2. The method of claim 1, wherein the Voronoi edge regions for the reference configuration and the search space are defined using an octal distance metric.

3. The method of claim 1, further comprising defining additional bisectors for Voronoi edge regions containing vertices not connected by a bisector to a design shape, thereby simplifying all Voronoi edge regions so as to have either three or four sides.

4. The method of claim 1, wherein initially defined search elements resulting from user selected bisectors have one or more default properties associated therewith, the default properties comprising one or more of orientation of the selected bisector, orientations of a pair of shape edges associated with the bisector, length of the selected bisector, length of unselected bisectors, and number of bisectors connected to specific vertices.

5. The method of claim 4, further enabling the user to modify individual properties of a search element after bisector selection.

6. The method of claim 1, wherein the constructing a search pattern from the one or more search elements defined from the reference configuration further comprises a planar sub-graph isomorphism technique.

7. The method of claim 1, wherein the constructing a search pattern from the one or more search elements defined from the reference configuration further comprises:
inserting enumerated orientations of the bisector of each search element as an index to a table;
determining similar indices for the reference elements;
finding an associated list of search elements from a first pair of reference elements, keeping only those pairs of search elements satisfying all applicable parameter constraints;
finding an associated list of search elements from a second pair of reference elements, with the second pair of reference elements sharing a common element with the first, and again keeping only those pairs of search elements satisfying all applicable parameter constraints;
finding pairs of the kept search elements from the first and second pairs of reference elements that share a common element so as to provide a match for a sequence of three search elements; and
repeating finding associated lists of search elements for subsequent pairs of reference elements until all reference elements are matched.

8. The method of claim 1, further comprising displaying, responsive to the user's request, adjacent search elements from matching patterns in the search space and corresponding adjacent search elements from the reference configuration that differ from one another.

9. A computer program product, comprising:
a non-transitory, computer readable storage medium having computer readable program code stored thereon that, when executed by a computer, implement a method for implementing pattern matching of integrated circuit features
, the method comprising:
computing Voronoi edge regions for both a reference configuration and a search space of an integrated circuit design to be searched and presenting the computed Voronoi edge regions of the reference configuration to a user;
receiving one or more selected bisectors of the Voronoi computed reference configuration from the user, indicative of user identified salient regions of design shapes and/or corners to be searched, so as to define one or more search elements, wherein a search element comprises a given bisector and a pair of Voronoi edge regions bounded thereby;
constructing a search pattern from the one or more search elements defined from the reference configuration;
examining the search space for matching sequences with respect to the search pattern; and
highlighting resulting matching patterns in the search space for the user.

10. The computer program product of claim 9, wherein the Voronoi edge regions for the reference configuration and the search space are defined using an octal distance metric.

11. The computer program product of claim 9, wherein the method further comprises defining additional bisectors for Voronoi edge regions containing vertices not connected by a bisector to a design shape, thereby simplifying all Voronoi edge regions so as to have either three or four sides.

12. The computer program product of claim 9, wherein initially defined search elements resulting from user selected bisectors have one or more default properties associated therewith, the default properties comprising one or more of orientation of the selected bisector, orientations of a pair of shape edges associated with the bisector, length of the selected bisector, length of unselected bisectors, and number of bisectors connected to specific vertices.

13. The computer program product of claim 12, wherein the method further comprises enabling the user to modify individual properties of a search element after bisector selection.

14. The computer program product of claim 9, wherein the constructing a search pattern from the one or more search elements defined from the reference configuration further comprises a planar sub-graph isomorphism technique.

15. The computer program product of claim 9, wherein the constructing a search patter from the one or more search elements defined from the reference configuration further comprises:
inserting enumerated orientations of the bisector of each search element as an index to a table;
determining similar indices for the reference elements;
finding an associated list of search elements from a first pair of reference elements, keeping only those pairs of search elements satisfying all applicable parameter constraints;
finding an associated list of search elements from a second pair of reference elements, with the second pair of reference elements sharing a common element with the first, and again keeping only those pairs of search elements satisfying all applicable parameter constraints;
finding pairs of the kept search elements from the first and second pairs of reference elements that share a common element so as to provide a match for a sequence of three search elements; and
repeating finding associated lists of search elements for subsequent pairs of reference elements until all reference elements are matched.

16. The computer program product of claim 9, wherein the method further comprises displaying, responsive to the user's request, adjacent search elements from matching patterns in the search space and corresponding adjacent search elements from the reference configuration that differ from one another.

17. A system for implementing pattern matching of integrated circuit features, comprising:
a computing network including a processing device in communication with one or more computer memory storage devices; and the computing network further configured to implement a method, the method further comprising:

computing Voronoi edge regions for both a reference configuration and a search space of an integrated circuit design to be searched and presenting the computed Voronoi edge regions of the reference configuration to a user;

receiving one or more selected bisectors of the Voronoi computed reference configuration from the user, indicative of user identified salient regions of design shapes and/or corners to be searched, so as to define one or more search elements, wherein a search element comprises a given bisector and a pair of Voronoi edge regions bounded thereby;

constructing a search pattern from the one or more search elements defined from the reference configuration;

examining the search space for matching sequences with respect to the search pattern; and highlighting resulting matching patterns in the search space for the user.

18. The system of claim 17, wherein the Voronoi edge regions for the reference configuration and the search space are defined using an octal distance metric.

19. The system of claim 17, wherein the method further comprises defining additional bisectors for Voronoi edge regions containing vertices not connected by a bisector to a design shape, thereby simplifying all Voronoi edge regions so as to have either three or four sides.

20. The system of claim 17, wherein initially defined search elements resulting from user selected bisectors have one or more default properties associated therewith, the default properties comprising one or more of orientation of the selected bisector, orientations of a pair of shape edges associated with the bisector, length of the selected bisector, length of unselected bisectors, and number of bisectors connected to specific vertices.

21. The system of claim 20, wherein the method further comprises enabling the user to modify individual properties of a search element after bisector selection.

22. The system of claim 17, wherein the constructing a search pattern from the one or more search elements defined from the reference configuration further comprises a planar sub-graph isomorphism technique.

23. The system of claim 17, wherein the constructing a search patter from the one or more search elements defined from the reference configuration further comprises:

inserting enumerated orientations of the bisector of each search element as an index to a table;

determining similar indices for the reference elements;

finding an associated list of search elements from a first pair of reference elements, keeping only those pairs of search elements satisfying all applicable parameter constraints;

finding an associated list of search elements from a second pair of reference elements, with the second pair of reference elements sharing a common element with the first, and again keeping only those pairs of search elements satisfying all applicable parameter constraints;

finding pairs of the kept search elements from the first and second pairs of reference elements that share a common element so as to provide a match for a sequence of three search elements; and repeating finding associated lists of search elements for subsequent pairs of reference elements until all reference elements are matched.

24. The system of claim 17, wherein the method further comprises displaying, responsive to the user's request, adjacent search elements from matching patterns in the search space and corresponding adjacent search elements from the reference configuration that differ from one another.

* * * * *